United States Patent
Attar et al.

(10) Patent No.: US 8,165,619 B2
(45) Date of Patent: Apr. 24, 2012

(54) POWER ALLOCATION FOR POWER CONTROL BITS IN A CELLULAR NETWORK

(75) Inventors: Rashid Ahmed Attar, San Diego, CA (US); Nagabhushana Sindhushayana, San Diego, CA (US); Peter J. Black, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 520 days.

(21) Appl. No.: 10/263,976

(22) Filed: Oct. 2, 2002

(65) Prior Publication Data
US 2004/0198404 A1  Oct. 7, 2004

(51) Int. Cl.
*H04B 7/00* (2006.01)
(52) U.S. Cl. .......................... 455/522; 455/69; 370/318
(58) Field of Classification Search .................. 455/522, 455/69, 63, 562, 560, 422, 517, 518, 127.1, 455/127.5, 63.1, 67.13; 370/318
See application file for complete search history.

(56) References Cited

U.S. PATENT DOCUMENTS

| | | | | |
|---|---|---|---|---|
| 5,574,983 A * | 11/1996 | Douzono et al. | ............... | 455/69 |
| 6,058,107 A * | 5/2000 | Love et al. | ................... | 370/332 |
| 6,148,208 A | 11/2000 | Love | | |
| 6,463,295 B1 * | 10/2002 | Yun | ................ | 455/522 |
| 6,535,738 B1 * | 3/2003 | Bomar et al. | ................ | 455/436 |
| 6,587,696 B1 * | 7/2003 | Ma et al. | ....................... | 455/522 |
| 6,678,257 B1 * | 1/2004 | Vijayan et al. | ................ | 370/320 |
| 6,687,510 B2 * | 2/2004 | Esteves et al. | ................ | 455/522 |
| 6,765,883 B1 * | 7/2004 | van Heeswyk | ................ | 370/318 |
| 6,831,910 B1 * | 12/2004 | Moon et al. | ................... | 370/342 |
| 7,020,179 B2 * | 3/2006 | Park | ................................ | 375/146 |
| 7,054,275 B2 * | 5/2006 | Kim et al. | ...................... | 370/252 |
| 7,085,581 B2 * | 8/2006 | Vanghi | ......................... | 455/522 |
| 7,099,298 B2 * | 8/2006 | Kim | ................................ | 370/342 |
| 7,142,562 B2 * | 11/2006 | Yavuz et al. | ................... | 370/468 |
| 7,185,257 B2 * | 2/2007 | Kim et al. | ...................... | 714/751 |
| 7,272,118 B1 * | 9/2007 | Yarkosky | ....................... | 370/328 |
| 2001/0012785 A1 | 8/2001 | Esteves et al. | | |
| 2002/0094833 A1 | 7/2002 | Lieshout et al. | | |
| 2003/0123406 A1 * | 7/2003 | Yavuz et al. | ................... | 370/333 |

FOREIGN PATENT DOCUMENTS

| | | |
|---|---|---|
| EP | 1143635 | 10/2001 |
| EP | 1207644 | 5/2002 |
| EP | 1217861 | 6/2002 |
| WO | 0054430 | 9/2000 |
| WO | 0227967 | 4/2002 |
| WO | 02099998 | 12/2002 |

OTHER PUBLICATIONS

International Search Report—PCT/US03/31586, International Search Authority—European Patent Office—Jul. 22, 2004.

* cited by examiner

*Primary Examiner* — Raymond Dean
(74) *Attorney, Agent, or Firm* — Eric Ho

(57) ABSTRACT

A power allocation value for power control information transmitted from a first station to a plurality of stations is determined by receiving data rate control information from the plurality of stations in a communications system. Supplemental information relating to the data rate control information is then generated, and an improved signal strength value is produced in accordance with the supplemental information. The power allocation value for the power control information transmitted from the first station to the plurality of stations is determined in accordance with the improved signal strength value.

44 Claims, 10 Drawing Sheets

POWER ALLOCATION FOR POWER CONTROL BITS IN A CELLULAR NETWORK

BACKGROUND

1. Field

The present invention relates generally to cellular networks. More specifically, the present invention relates to power allocation for power control bits in such networks.

2. Background

Spread spectrum techniques, such as code division multiple access (CDMA) techniques, are used to communicate information over wireless communication systems. For example, CDMA techniques are in wide use for communications between stationary base stations and remote stations (e.g., mobile cellular telephones) in a cellular network. In accordance with CDMA techniques, several streams of information, typically from different sources or sectors, are each encoded or "channelized" using a different code. These codes allow the information to be transmitted over the same frequency band (commonly referred to as a "CDMA channel"). Each such channelized information stream is commonly referred to as a "code channel".

Increasing demand for wireless data transmission and the expansion of services available via wireless communication technology has led to the development of specific data services such as 1x evolution data only (1xEV-DO), which was based on the High Data Rate (HDR) system. An exemplary 1xEV-DO type system is defined in Telecommunications Industry Association/Electronic Industries Alliance (TIA/EIA)/IS-856 "cdma2000 High Rate Packet Data Air Interface Specification," which is one of the first 3G systems used for packet data services with forward link peak rates of up to 2.4 Mbps.

In an exemplary 1xEV-DO system, a forward link transmission, which is defined as data transmission from one base station to one remote station, is defined in terms of frames. A frame is further sub-divided into time slots. Each time slot includes at least a forward Medium Access Channel (MAC) and a Forward Traffic Channel (FTC). The MAC is composed of up to 63 code channels, which are orthogonally covered by 64-ary Walsh codes. Each code channel is identified by a MAC index, which has a value between 1 and 63. The MAC indices include a code-division multiplexed reverse activity (RA) channel and up to 59 reverse power control (RPC) channels. For each sector of a cellular network, a unique MAC index is assigned to transmit information to a specific remote station. In the context of 1xEV-DO, the power control bits in the MAC index identifies, for example, the Walsh channel used to spread the corresponding RPC channel. Furthermore, the remote station uses the assigned MAC index to identify transmissions on the FTC, which is a time division multiplexed channel shared by all remote stations communicating with a given sector. A data scheduler in the base station allocates slots to a user specified by the data rate control information in the data rate control (DRC) channel of the reverse link, which is defined as data transmission from the mobile station to one or more base stations.

When transmitting over the forward link in an 1xEV-DO system, the same amount of power is used to transmit each code channel in the CDMA channel. However, since each MAC index is intended for a different remote station, it has been found to be advantageous to vary the power allocated to the MAC index. The conventional power allocation for the MAC index is based on forward link channel state information received from the remote stations. This information is conveyed by the data rate control value fed back via the DRC feedback channel. A higher data rate control value indicates better channel conditions and therefore less allocated power is needed to ensure a predetermined level of reliability on the power control channel. A lower (or erased) data rate control value indicates poorer channel conditions and therefore greater allocated power is needed to ensure the same level of reliability. However, it has been found that, under certain conditions, using the data rate control value received on the DRC feedback channel to allocate power for the transmission of the MAX index can cause allocation of greater amount of power than is necessary for reliable reception at the remote station.

There is therefore a need in the art for appropriately modifying power allocation for transmission of power control bits in the MAC.

SUMMARY

Embodiments disclosed herein address the above stated needs for allocating power to forward link power control channels.

In one aspect, a power allocation value for power control information transmitted from a first station to a plurality of stations is determined by receiving data rate control information from the plurality of stations in a communications system. Supplemental information relating to the data rate control information is then generated, and an improved signal strength value is produced in accordance with the supplemental information. The power allocation value for the power control information transmitted from the first station to the plurality of stations is determined in accordance with the improved signal strength value.

In another aspect, an automatic repeat request (ARQ) procedure is used to determine an effective data rate. The effective data rate is then adjusted depending on a destination sector of the effective data rate. The power allocation value for the power control information transmitted from the first station to the plurality of stations is produced in accordance with the adjusted effective data rate.

In a further aspect, a signal-to-interference-and-noise ratio (SINR) prediction that was estimated and fed back from each respective one of a plurality of remote stations is received at a base station. A power allocation value for power control information transmitted from the first station to the plurality of stations is then determined in accordance with the SINR prediction.

In a further aspect, a base station in a communications system is described. The base station includes a receiver configured to receive data rate control information from each of a plurality of remote stations. The base station also includes a signal processor, coupled to the receiver, configured to generate supplemental information relating to the data rate control information. The signal processor produces an improved signal strength value in accordance with the supplemental information, and determines a power allocation value for power control information transmitted from the base station apparatus to the plurality of remote station devices in accordance with the improved signal strength value.

BRIEF DESCRIPTION OF THE DRAWINGS

The features, objects and advantages of the present invention will become more apparent from the detailed description set forth below when taken in conjunction with the drawings in which like reference characters identify like elements.

DETAILED DESCRIPTION

Figure 1:
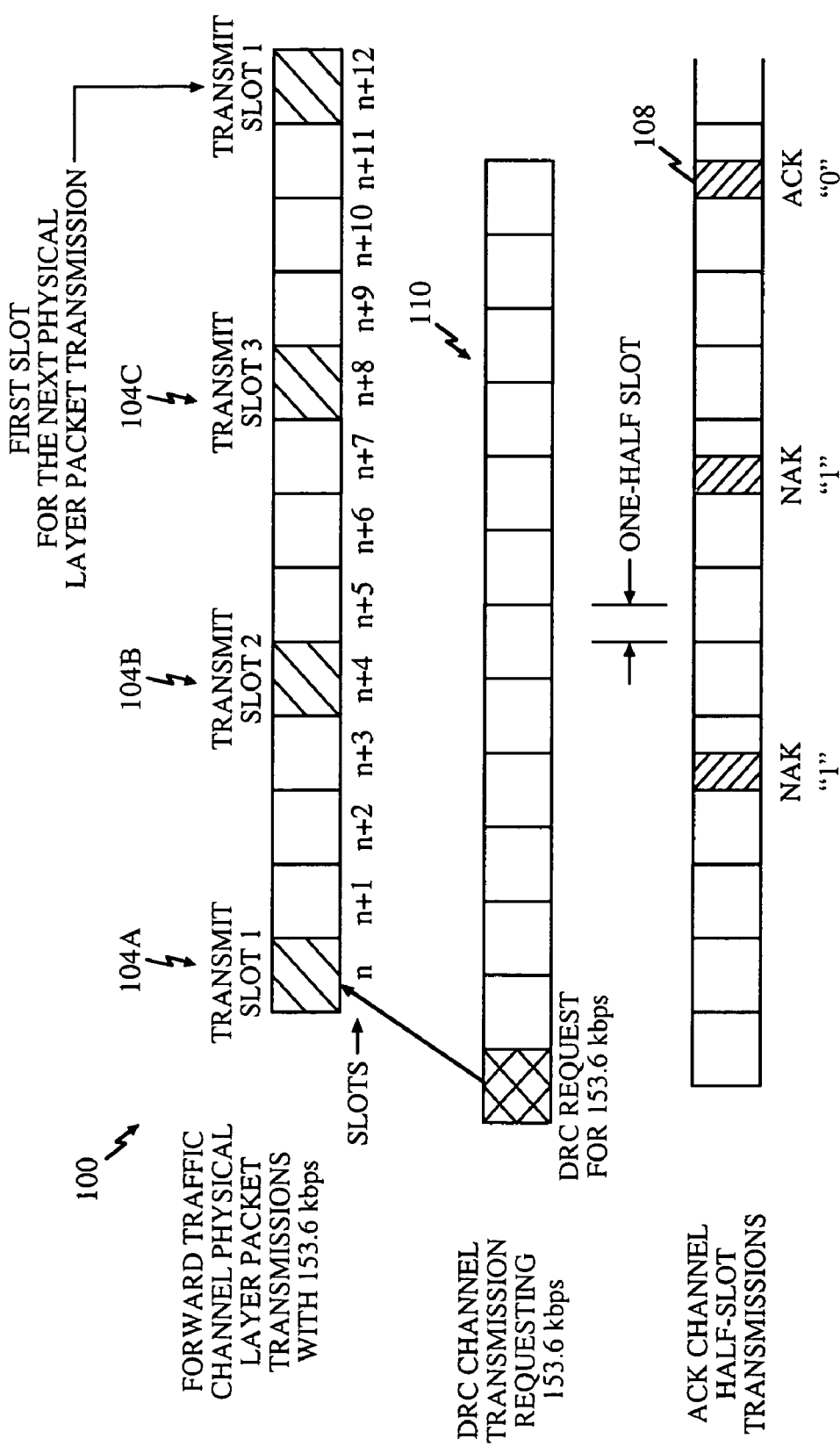
FIG. 1 is an illustration of the timing formats of the Forward Traffic Channel, the Data Rate Control Channel, and the Acknowledge Channel in a communications system.

The word "exemplary" is used herein to mean "serving as an example, instance, or illustration." Any embodiment described herein as "exemplary" is not necessarily to be construed as preferred or advantageous over other embodiments.

In recognition of the above-stated shortcomings associated with conventional power allocation schemes in a code division multiple access (CDMA) channel, this disclosure describes exemplary embodiments for allocating power to the forward medium access channel (MAC) index using the actual computed data rate instead of the data rate control information in the data rate control (DRC) channel received from the remote station.

In packet data transmission systems, such as 1x evolution data only (1xEV-DO) system, the data may be divided into several packet slots. Under certain conditions, the multi-slot packet transmissions on the Forward Traffic Channel (FTC) allow time for a receiving remote station to fully decode the intended information from a partially received packet (i.e., a subset of the slots in a packet) and to return an indication (that the intended information has been fully decoded) to the transmitting sector via the acknowledge (ACK) channel on the reverse link. If a positive acknowledgement is received, data transmission may terminate early, and the remaining packet slots do not need to be transmitted and may be allocated for the transmission of another data packet(s), possibly to different users. Since the remaining slots may be used to transmit other data, the actual (or "effective") data rate may be higher than the data rate control value would indicate. A higher effective data rate indicates that less power may be allocated to the power control bits in the MAC.

Further, when more accurate power allocation is desired, the predicted forward signal-to-interference-and-noise ratio (SINR) may be directly fed back to a base station from the remote station. The effectiveness of this SINR feedback technique generally depends on several factors including feedback channel reliability, quantization, and degradation of available reverse link capacity. For example, feedback channel reliability dictates a low error rate for accurate power allocation of the reverse power control (RPC) channel. Consequently, for purposes of illustration and not for purposes of limitation, the exemplary embodiments of the invention are described in a manner consistent with such use, though the invention is not so limited.

In a system used primarily for transmitting information at high data rates over a wireless communication link (e.g., high data rate air interface according to TIA/EIA/IS-856 "cdma2000 High Rate Packet Data Air Interface Specification"), at any given time all of the code channels in one direction are used to provide parallel data paths for information from a first end point to a second end point of the communication link. For example, information transmitted from a base station (first end point) to a remote station (second end point) is transmitted over all of the code channels in a transmission path direction. The transmission path in this direction is commonly referred to as either the "forward link" or "down link". In such a system, transmission of data (not applicable to transmission of MAC indices) to different remote stations are time multiplexed. For example, during a first time slot, all of the code channels of the CDMA channel are allocated to transmitting information to a first remote station. During a second time slot, all of the code channels of the CDMA channel are allocated to transmitting information to a second remote station. Additional time slots provide communication links between the base station and other remote stations.

In one embodiment, the first end point of the communication link is a base station and the second end point of the communication link is a remote station. In another embodiment, the first end point of the communication link is a remote station and the second end point of the communication link is a base station. A base station is also known as an access point. A remote station is also known as an access terminal. The data path by which information is transmitted from a particular remote station to a base station is commonly referred to either as the "reverse link" or the "up link".

FIG. 1 illustrates exemplary multi-slot packet transmissions 100 on the Forward Traffic Channel (FTC) having a 4-slot interlacing structure. Thus, for example, three time slots, n+1, n+2, and n+3, occur between successive packet slot transmissions 104a and 104b of a multi-slot packet. Similarly, slot transmissions 104b and 104c are separated by time slots n+5, n+6, and n+7, and so on. The 4-slot interlacing allows time for the receiving remote station to decode the partially received packet having three slots 104a, 104b, 104c, and to return an indication (that the intended information has been fully decoded) to the transmitting base station or sector via the acknowledge (ACK) channel 106 on the reverse link. If a positive acknowledgement is received, as indicated by the ACK '0' data 108, the remaining slots are not transmitted and may be allocated for the transmission of another data packet(s), possibly to different users. This is referred to as an "early termination." Therefore, the early termination of multi-slot packets increases the effective throughput of the system, which provides an effective data rate for transmission of data from the remote station to the base station that is higher than the data rate control value indicated in the DRC channel 110. The early-termination of multi-slot packets is sometimes referred to as an automatic repeat request (ARQ) procedure.

For example, in FIG. 1, a requested data rate of 153.6 kbps for a 4-slot packet is made by a remote station on the DRC channel 110. After the third slot (Transmit Slot 3) 104c of the packet, an ACK data 108 is received at the base station to indicate that the remote station has correctly decoded the intended information. Therefore, the fourth slot of the packet is not transmitted. Rather, what would have been the Transmit Slot 4 of the first message is used to transmit the first slot of another message. An effective 33% higher data transmission rate (204.8 kbps) is achieved by using the early termination information because, in this example, 33% more data can be transmitted in the same amount of time.

In one embodiment, the data rate obtained from the early-termination information can be used as the effective data rate to compute the power allocation value for longer than the current slot. For example, in the illustrated example of FIG. 1, if a given packet with a requested data rate in the DRC channel of 153.6 kbps terminated early in two slots (i.e., $e_k$=307.2 kbps), this early-termination information can be used as the effective data rate not just for slot n+4, but for the next T additional slots. However, if a new packet is received before the completion of the T additional slots, then the new early-termination information derived from the new packet is used as the effective data rate from that point on for that slot and for the next T additional slots, or until another new packet is received. The term T can be determined by simulations and tests based on such parameters as channels conditions and SINR variances. A typical value for T is 16. However, as mentioned, other values for T may be used based on channel conditions and SINR variances, in accordance with the system implementation.

Figure 2:
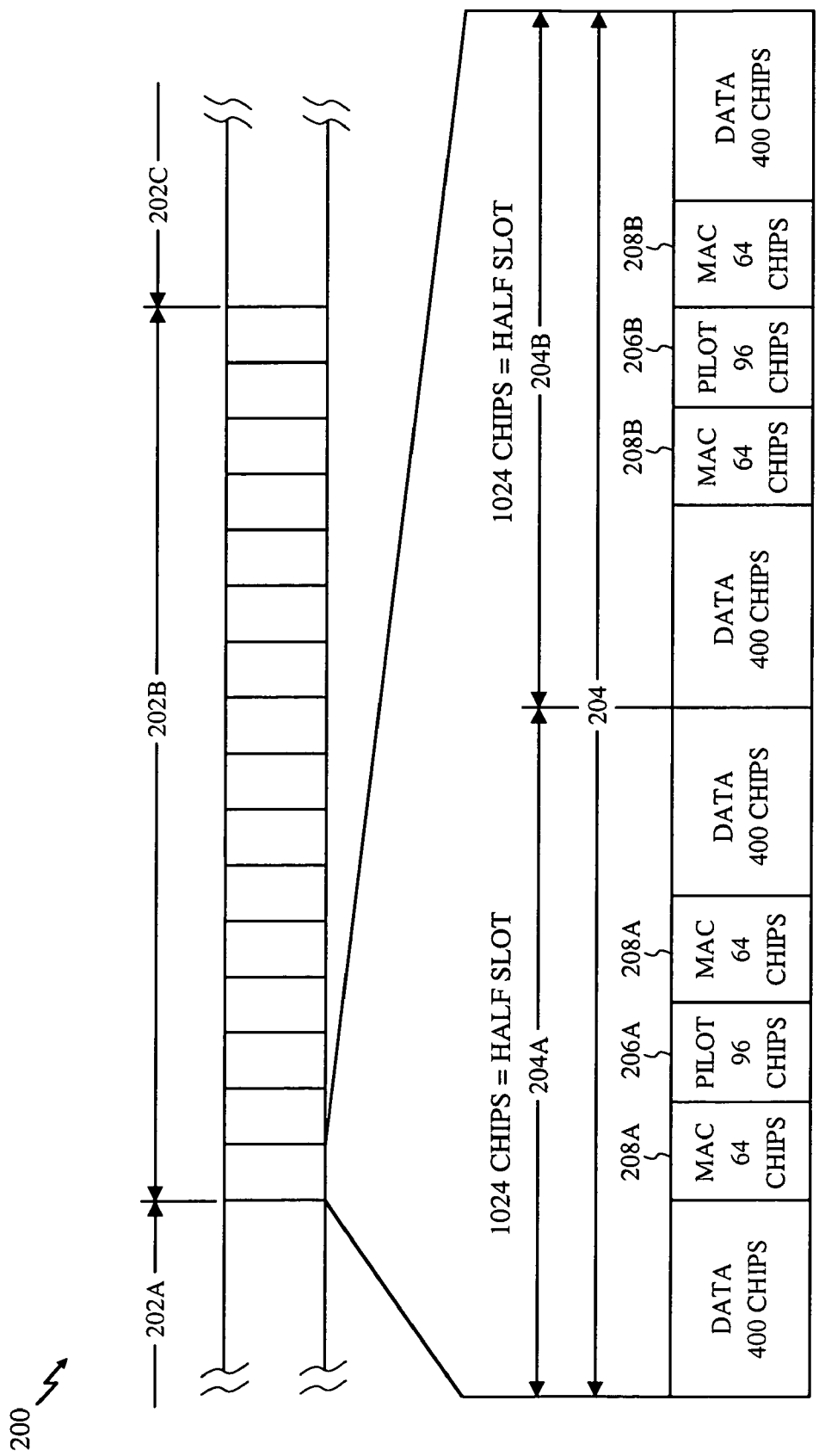
FIG. 2 is an illustration of the format of a forward link of an exemplary communication system.

FIG. 2 shows a forward link 200 of an exemplary 1xEV-DO system, which is defined as data transmission from one base station to one remote station. The forward link 200 is defined in terms of frames 202a, 202b, 202c. In the exemplary system, a frame 202b comprises 16 time slots, each time slot being 2048 chips long, corresponding to a 1.67 ms slot duration, and consequently, a 26.67 ms frame duration. Each slot 204 is divided into two half-slots 204a, 204b, with a pilot burst 206a, 206b transmitted within each half-slot 204a, 204b. In the exemplary system, each pilot burst 206a, 206b is 96 chips long, and is centered at the mid-point of its associated half-slot 204a, 204b. A forward MAC 208a, 208b is also transmitted in each half-slot 204a, 204b. In the exemplary system, the MAC is composed of up to 63 code channels, which are orthogonally covered by 64-ary Walsh codes. Each code channel is identified by a MAC index, which has a value between 1 and 63, and identifies a unique 64-ary Walsh cover. The MAC symbol Walsh covers are repeated 2 times per time slot to form two bursts of length 64 chips each, which are transmitted immediately before and immediately after the pilot burst.

The MACs 208a, 208b include a code-division multiplexed reverse activity (RA) channel and up to 59 reverse power control (RPC) channels. The RPC channel is used for reverse link power control at a 800 Hz update rate. The common RA channel is used to indicate reverse loading for the reverse link MAC technique. Each of the MACs 208a, 208b is spread using a 64-ary Walsh function and repeated four times, resulting in the allocated 256 chips per slot. For each sector, a unique MAC index is assigned to address information to the specific remote station. The MAC index identifies, for example, the Walsh channel used to spread the corresponding RPC channel.

The Forward Traffic Channel (FTC) is transmitted during the 1600 data chips allocated in each slot 204 as depicted in FIG. 2. The remote station also uses the assigned MAC index to identify transmissions on the FTC, which is a time division multiplexed channel shared by all remote stations communicating with a given sector. A data scheduler in the base station allocates slots to a user (remote station) depending on the data rate control information specified by the data rate control (DRC) channel on the reverse link, which is defined as data transmission from the remote station to one or more base stations.

Reserved portions of the MAC within one slot form a "reverse power control" (RPC) channel over which power control information is transmitted. Each such RPC channel on the forward link is associated with one remote station. The power control information that is transmitted on a particular RPC channel is intended to be received and used by one particular remote station to control the reverse link power transmitted by that particular remote station. The power control information is determined by a base station and assists in maintaining the output power from each remote station at a minimum level required for information to be reliably received from each remote station on the reverse link.

In some instances, determining the amount of power that is required by each RPC channel is difficult for some base stations from which transmission of RPC information would be desirable. It should be noted that the amount of power "required" to "reliably" transmit information, as referred to herein, is the amount of power that is needed to ensure that the information can be decoded with a predetermined error rate. Therefore, a base station will not allocate power to remote stations that do not have that particular base station in what is referred to as the "active set" of the remote station, because the forward link is so weak that the power information would not be received and would result in wasted power on the power control channels. An active set is a list of base stations maintained by a remote station to keep track of the base stations within some acceptable criteria for possible data transmission. This can be understood from the following example.

Figure 3:
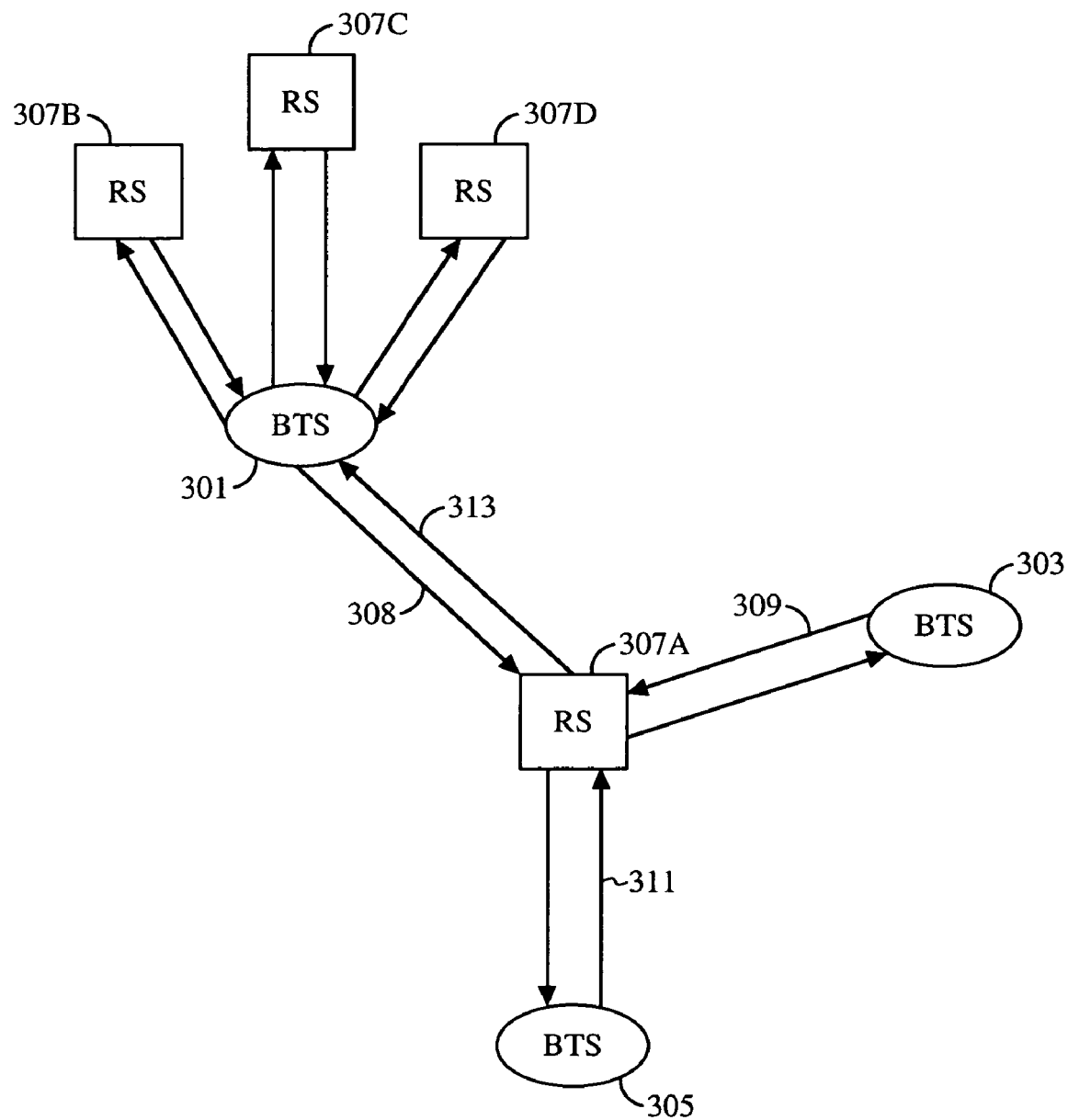
FIG. 3 is an illustration of a communication system that includes seven base stations.

FIG. 3 is an illustration of a system including three base stations 301, 303, 305 and four remote stations 307. Assume for simplicity that each base station 301, 303, 305 has only one sector. Each remote station 307 typically maintains a list (commonly referred to as the "active set") of base station sectors 301, 303, 305 from which the forward link to that remote station 307 may originate. However, the forward link will only originate from one of the base station sectors 301, 303, 305 in the active set at any one time. This is sometimes referred to as a "serving sector" forward link. The transmission paths 309, 311 between those base station sectors 303, 305 that are not transmitting over the forward link 308 to the remote station 307A typically have different loss characteristics than the transmission path 313 between the base station sector 301 that is transmitting over the forward link 308 and the remote station 307A. Since nothing is being transmitted to the remote station 307A from the other base station sectors 303, 305 in the active set, it is not possible to characterize the loss over the forward links 309, 311 between the other base station sectors 303, 305 and the remote station 307A. Nonetheless, the remote station 307A will be transmitting to the other base station sectors 303, 305. Therefore, it is desirable to have each base station sector 301, 303, 305 in the active set send reverse link power control information to the remote station 307A.

Generally, as a remote station moves away from a base station (i.e., as the SINR decreases), the RPC channel for that remote station requires more power to transmit information reliably from the base station to the remote station. Since there is a maximum total amount of power that can be transmitted over all channels, the power of another RPC channel must be reduced. Therefore, it is desirable to dynamically allocate a sector of a base station's total transmit power among RPC channels of the remote stations that have the sector of the base station in their active list.

The conventional allocation of power to each of a plurality of RPC channels to be transmitted from a base station was typically based on the data rate control information transmitted to the base station. However, since base stations transmit RPC channels to remote stations that have not transmitted the relevant data rate control information (i.e., data rate to be used in a forward link from the transmitting base station to a particular remote station that did not transmit the data rate control information for that forward link) to the transmitting base station, data rate control information from the transmitting remote station may be used to determine the quality of the forward link over which the reverse link power control is to be transmitted.

For the purpose of this disclosure, quality is directly proportional to the amount of power required to reliably transmit a predetermined amount of information in a predetermined amount of time with a predetermined error rate. Although the remote station to which the RPC channel is to be directed has not transmitted data rate control information directed to that base station, the disclosed method and apparatus enables the base station to allocate appropriate amount of power to the RPC channel of the remote station. The base station allocates power to the RPC channels based upon information provided to the base station in data rate control information that was received by the base station, regardless of whether the data rate control information was directed to other base stations. Accordingly, the base station can allocate power among the RPC channels without having received explicit information as to the quality of the forward link between the base station and every remote station intended to receive the information on the RPC channels.

The method and apparatus that is described in this disclosure allows a first station (such as a base station within a communication system) to determine how much power to allocate to each RPC channel that is being transmitted by the first station. For the purpose of this disclosure, an RPC channel is defined as any portion of a communication path that is used to communicate information from a first station to a second station regarding the amount of power the receiving second station should transmit back to the first station.

FIG. 3 shows a communication system that includes seven stations 301, 303, 305, 307A, 307B, 307C, 307D. In accordance with an exemplary embodiment of the disclosed method and apparatus, the first, second and third stations 301, 303, 305 are base stations. The fourth, fifth, sixth, and seventh stations 307 are remote stations (such as a wireless local loop telephone, a hand held telephone, a modem, a computer terminal, or another device or system used to originate information to be transmitted over the communication system). It should be understood that the number of remote stations in a system or network is typically much greater than the number of base stations. However, only four remote stations 307 are shown in FIG. 3 for the sake of simplicity. It should also be understood that each of the stations 301-307 may be either a remote station or a base station, depending upon the type of communication system in which these stations are being used.

The disclosed method and apparatus is described essentially in the context of allocation of power among RPC channels. However, in systems in which the roles of the forward and reverse links are reversed from that set forth in this description, the disclosed method and apparatus applies equally well to the allocation of power among "forward link power control" channels. Nonetheless, for ease and clarity, the disclosed method and apparatus is described in the context of allocation of power to RPC channels transmitted in the forward link.

In accordance with one embodiment of the disclosed method and apparatus, multiple remote stations concurrently transmit data over the reverse link to one base station. Furthermore, the data is transmitted from each remote station to a base station on a separate code channel. For example, the four remote stations 307 may each be transmitting information over the reverse link to the base station 301.

As noted above, each remote station maintains an active set. A sector of a base station is placed in the active set of a remote station if that base station is transmitting a forward link that is being received by the remote station 307 with at least an acceptable level of quality. In one embodiment, the quality of the forward link is determined by the quality of portions 206a, 206b of the forward link 200, referred to as the "Pilot Channel." In one embodiment, a Pilot Channel is made up of portions 206a, 206b of the forward link that are used by a remote station to determine the quality of the forward link and to determine the relative phase of the information being received by a remote station. The Pilot Channel is transmitted on only one code channel from among the code channels in the CDMA channel. Furthermore, the Pilot Channel is transmitted only during two fields 206a, 206b of each slot 204.

The quality of the Pilot Channel may be determined by measuring a ratio of signal to interference plus noise, frequently referred to as "SINR". Such measurements of the quality of the Pilot Channel are well known to those skilled in the art. The quality of the Pilot Channel can be used to determine the quality of the entire forward link. It should be understood that the quality of the forward link may be determined by any other means known, such as by measuring the signal to noise ratio of a forward link "Traffic channel" (i.e., that portion of the forward link that carries the data). Alternatively, any other portion of the forward link may be used to determine the quality of the forward link. However, since the Pilot Channel is spread in a predetermined manner, it provides an appropriate mechanism for determining the quality of the forward link. Nonetheless, SINR is only one parameter that can be used by the remote station to determine the quality of the forward link. Any other method for determining the quality of the forward link can be used in accordance with the disclosed method and apparatus.

If the quality of the forward link received by a remote station is such that data can be transmitted over the forward link at some acceptable data rate with acceptable reliability, then the transmitting base station may be included in the remote station's active set. However, a Pilot Channel from a particular base station may be received by the remote station with sufficient quality and still not be added to the active set. This may be true if there are a predetermined number of active base stations already in the active set and the active set can only support the predetermined number of active base stations.

In the exemplary embodiment in which SINR is used to determine the quality of the forward link, the remote station 307 calculates a data rate based upon the SINR of the Pilot received from the selected base station. The data rate is calculated to result in data being received at the remote station with acceptable reliability. It will be understood by those skilled in the art that the reliability with which data can be transmitted depends upon the quality of the forward link (i.e., the SINR) and the data rate.

Since the remote station 307A only receives data from one of the base stations in the active set at any one time, the remote station 307A selects one of the base stations in the active set to transmit data to the remote station 307A. The selected base station 301 is the base station from which the remote station 307A receives the best quality forward link (i.e., the base station transmitting the forward link capable of supporting the highest data rate) among the base stations that achieve a minimum reliability on the DRC feedback channel. If the data rate control information from the remote station to the base station with the best forward link are erased, the base station cannot transmit any data to that particular remote station. In accordance with an exemplary embodiment, the data rate at which the selected base station can reliably transmit data to a particular remote station is communicated to the selected base station by the particular remote station 307 over the reverse link 313. The data rate control information is encoded with a unique code that indicates the destination base station.

Once the selected base station 301 receives the data rate control information, the base station 301 determines whether the early-termination information (i.e., the effective data rate) is available. If the early-termination information is available, the effective data rate produced by the early-termination is used to replace the data rate control information (refer to the description of FIG. 1 to find the correlation between the early-termination information and the effective data rate). The selected base station uses this information to determine the SINR of the Pilot that was received by the transmitting remote station 307A. The method used by the selected base station 301 to map the SINR of the forward link transmitted from the data rate is the inverse of the method used by the remote station 307A to calculate the data rate from the measured SINR of the forward link Pilot signal.

The selected base station 301 determines the amount of power to allocate to a particular RPC channel based upon the quality of the forward link (e.g., a forward link signal strength indication) as determined by the remote station 307A. The forward link can support as many RPC channels as there are code channels. Each such RPC channel is intended for a different remote station 307. The number of RPC channels to be transmitted by a base station 301 is equal to the number of remote stations that include that base station 301 in their active set. For example, if only three remote stations 307A, 307B, 307C have a particular base station 301 in their active set, then the base station 301 transmits over a forward link 308 that includes three RPC channels, one RPC channel intended for each of the three remote stations 307A, 307B, 307C that include that base station 301 in their respective active sets.

The base station 301 also receives information over the reverse link from each of these three remote stations 307A, 307B, 307C. Accordingly, the receiving base station 301 must provide power control information to each of the three remote stations 307A, 307B, 307C. This information is provided in a power control message over the RPC channels. Each such RPC channel is transmitted over a MAC channel 208a, 208b (FIG. 2) during the power control fields of each slot. No power is allocated to the unused RPC channels (i.e., to the other MAC indices). Therefore, if the forward link uses a CDMA channel that includes thirty-two code channels, only three of the thirty-two code channels are required during the reverse link power control fields 208a, 208b (assuming that the base station is included in the active sets of only three remote stations). Accordingly, no power is allocated to the other twenty-nine MAC indices of the forward link. This allows the maximum amount of power to be allocated to the three RPC channels that are directed to remote stations 307A, 307B, 307C that include the base station 301 in their active set. Each remote station 307A, 307B, 307C determines which particular power control message is intended for that remote station based upon the particular MAC channel 208a, 208b over which the message is sent (i.e., the particular MAC channel 208a, 208b that is used to support the RPC channel).

It can be seen that the allocation of power among the RPC channels involves the base station determining the quality of the RPC channel in order to determine the amount of power to allocate to each of the RPC channels. A base station that is added to the active set of a remote station will receive overhead messages, either directly from the remote station or through another base station which then communicates the information to the base station that has been added. Therefore, a base station can maintain a list of those remote stations that include that base station in their active set. However, in one embodiment, each remote station transmits the information regarding the quality of only one forward link. That is, a remote station transmits only the information regarding the forward link between that remote station and the one base station that is currently selected by that remote station to transmit data to that remote station.

For example, assume the active set of the remote station 307A includes the three base stations 301, 303, 305. The remote station 307A transmits the data rate control information to the base station 301, assuming that the forward link 308 between the base station 301 and the remote station 307A has a higher quality than the other two forward links 309, 311. If the effective data rate is available, the effective data rate is used to replace the data rate control information. This data rate control information can be used to determine the quality of the forward link 308 (and so the quality of the RPC channel). However, while the base stations 303, 305 also receive the data rate control information transmitted from the remote station 307A, the data rate control information is only relevant to the forward link 308 between the selected base station 301 and the remote station 307A. Therefore, the other base stations 303, 305 in the active set have no information about the current quality of the forward links 309, 311 between them and the remote station 307A.

As described above, the power required for the RPC channel is not the same for all remote stations. Remote stations close to the base station require less power than remote stations near the cell edge. More particularly, if the available power is divided equally among all remote stations, then remote stations with low forward link SINR are likely to experience a high RPC bit error rate, thereby degrading reverse link capacity. The forward link rate requested by the remote station on the DRC channel is an indicator of its SINR. The allocation technique described herein uses the data rate control information (which is replaced by the effective data rate, if available) to allocate power among the different users in proportion to their needs. Hence, rather than allocating power among the RPC channels either arbitrarily or equally, the disclosed method and apparatus uses data rate control information from the transmitting remote station to determine the quality of the forward link over which the reverse link power control is to be transmitted, and to assist in determining the quality of each of the RPC channels to be transmitted.

A digital signal processor (DSP) of the remote station maintains an estimate of the forward link SINR in dB as seen by the remote station. This estimate is used to calculate how much power is required for the remote station's RPC channel. A higher SINR value indicates a lower requirement on the RPC channel power.

Figure 4:
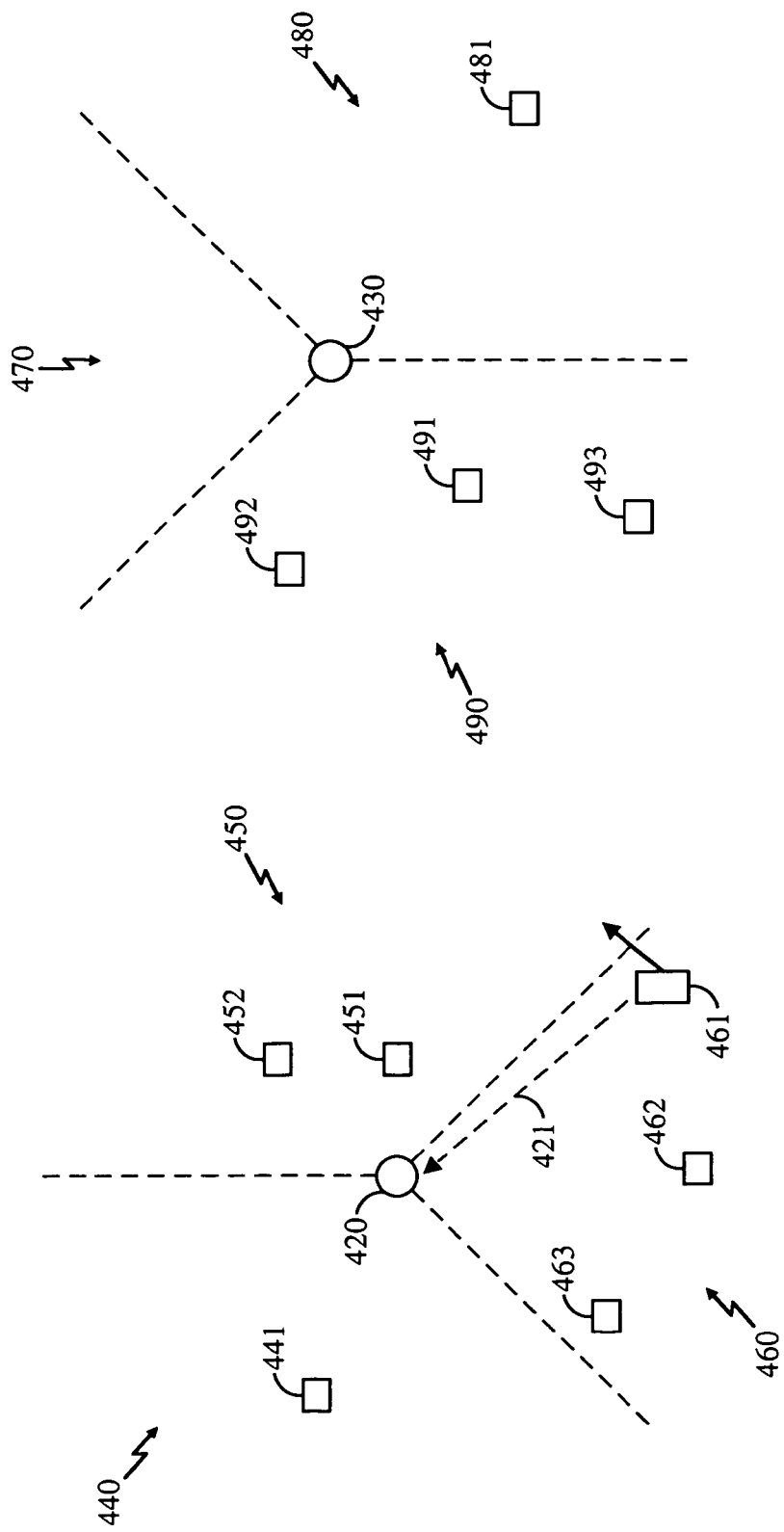
FIG. 4 is an illustration of a communication system including two base stations and ten remote stations.

FIG. 4 is an illustration of a system including two base stations 420, 430, and ten remote stations 441, 451, 452, 461, 462, 463, 481, 491, 492, 493. The first base station 420 has three sectors 440, 450, 460. The second base station 430 has three sectors 470, 480, 490. Sector One 440 of base station 420 has a coverage area including one remote station 441. Sector Two 450 of base station 420 has a coverage area including two remote stations 451, 452. Sector Three 460 of base station 420 has a coverage area including three remote stations 461, 462, 463. Sector One 470 of base station 430 has a coverage area that does not include a remote station. Sector Two 480 has a coverage area including only one remote station 481. Sector Three 490 has a coverage area including three remote stations 491, 492, 493. The remote station 461 is moving from Sector Three 460 of base station 420 to Sector Two 450 of the base station 420.

It is assumed that the active sets of the six remote stations 441, 451, 452, 461, 462, 463 include the sectors of the first base station 420 and it is assumed that the active sets of the four remote stations 481, 491, 492, 493 include the second base station 430. There is overlap between base station sectors. For example, Sector Two 450 of the first base station 420 and Sector Three 490 of the second base station 430 may overlap. Consequently, remote stations 451, 452 may have the second base station 430 in their active list and remote stations 491, 492, 493 may have the first base station 420 in their active list. The first base station 420 is receiving data from at least six remote stations 441, 451, 452, 461, 462, 463. The second base station 430 is receiving data from at least four remote stations 481, 491, 492, 493. The first base station 420 receives the data rate control value over a reverse link 421 associated with the remote station 461, and stores the received data rate control value (which is replaced by the effective data rate, if available) in its memory.

As the remote station 461 moves from one sector to another, the allocation of power to the RPC channel corresponding to all of the remote stations is dynamically changed, taking into account the change in the power required by the remote station 461. Each sector is not limited to three remote stations. A base station may have any number of remote stations limited only by various factors including the reverse link capacity.

The first base station 420 makes power control (PC) decisions for each remote station in its coverage area. Thus, the base station 420 determines whether the remote station 461 is transmitting the reverse link 421 with too much or too little power. In accordance with one embodiment, this determination is based upon a SINR measurement of the reverse link. In accordance with another embodiment, this determination is based on the error rate of the reverse link 421. Both schemes ensure reliable reception of message data without using more transmit power than is required. Those skilled in the art will understand that there are many other ways in which the base station can determine whether the remote station has transmitted the information over the reverse link with an appropriate amount of power to be reliably received by the base station, but without using more power than is required. Accordingly, any known means may be used for making this determination in accordance with the disclosed method and apparatus.

The requested data rate in the data rate control information (which is replaced by the effective data rate, if available) from the remote station in a reverse link provides an indication of the serving sector forward link SINR. As described above, the "serving sector" is the sector from which the remote station receives the forward link data. This information is conveyed to all sectors in the active set using the DRC feedback channel and is used by the current reverse power control (RPC) power allocation technique. Using the DRC-SINR mapping (e.g., based on turbo-decoder performance), an estimate of the serving sector SINR seen at the remote station is generated at the base station and is used to determine the power allocation required on the RPC channel to achieve the target ratio of bit-energy-to-noise density ($E_b/N_o$). The details of the power allocation to achieve the target ratio of $E_b/N_o$ is described below in conjunction with FIG. 5B.

As described above in the description of the ARQ procedure (shown in FIG. 1), the effective data rate on the forward link may be higher than the requested data rate in the data rate control information. This effective data rate may be used to refine the estimate of the serving sector forward link SINR. In slow-fading channels, ARQ gain is low because the remote station prediction/estimation techniques track changes in serving sector SINR fairly well. Thus, the variance of the predicted SINR is low, resulting in a small difference between the true forward link SINR and the predicted SINR generated from the requested data rate-SINR mapping. Therefore, excess power allocation on the RPC channel is low. However, in fast-fading channels, the ARQ gains are high because the initial channel estimate, and therefore, the requested data rate is conservative to ensure a low target packet error rate (PER) of about 1%. Hence, the true SINR is typically higher than the SINR obtained from the data rate-SINR mapping approximately 99% of the time, and the SINR estimates are biased lower, resulting in over allocation of RPC channel power. That is, more RPC channel power is allocated than is actually needed for good signal transmission. This may result in under-allocation of power on the power control channel to users that need the extra power for reliable signal transmission. Furthermore, this may limit the number of simultaneous users that the system may support.

The RPC power allocation at the non-serving sectors (i.e., the sector that does not transmit data to the remote station but is part of the remote station's active set) is a function of the handoff state and the SINR estimate, and therefore, results in excess allocation also at the non-serving sectors. Furthermore, the DRC feedback channel update rate depends on the handoff state. The settings currently used for the data rate length (DRC Length) are two slots for a no-handoff situation (i.e., active cell size=1) and four slots for 2-plus-way soft handoff. Accordingly, larger DRC Lengths degrade the accuracy of the forward link SINR estimate derived from the data rate-SINR mapping.

Figure 5A:
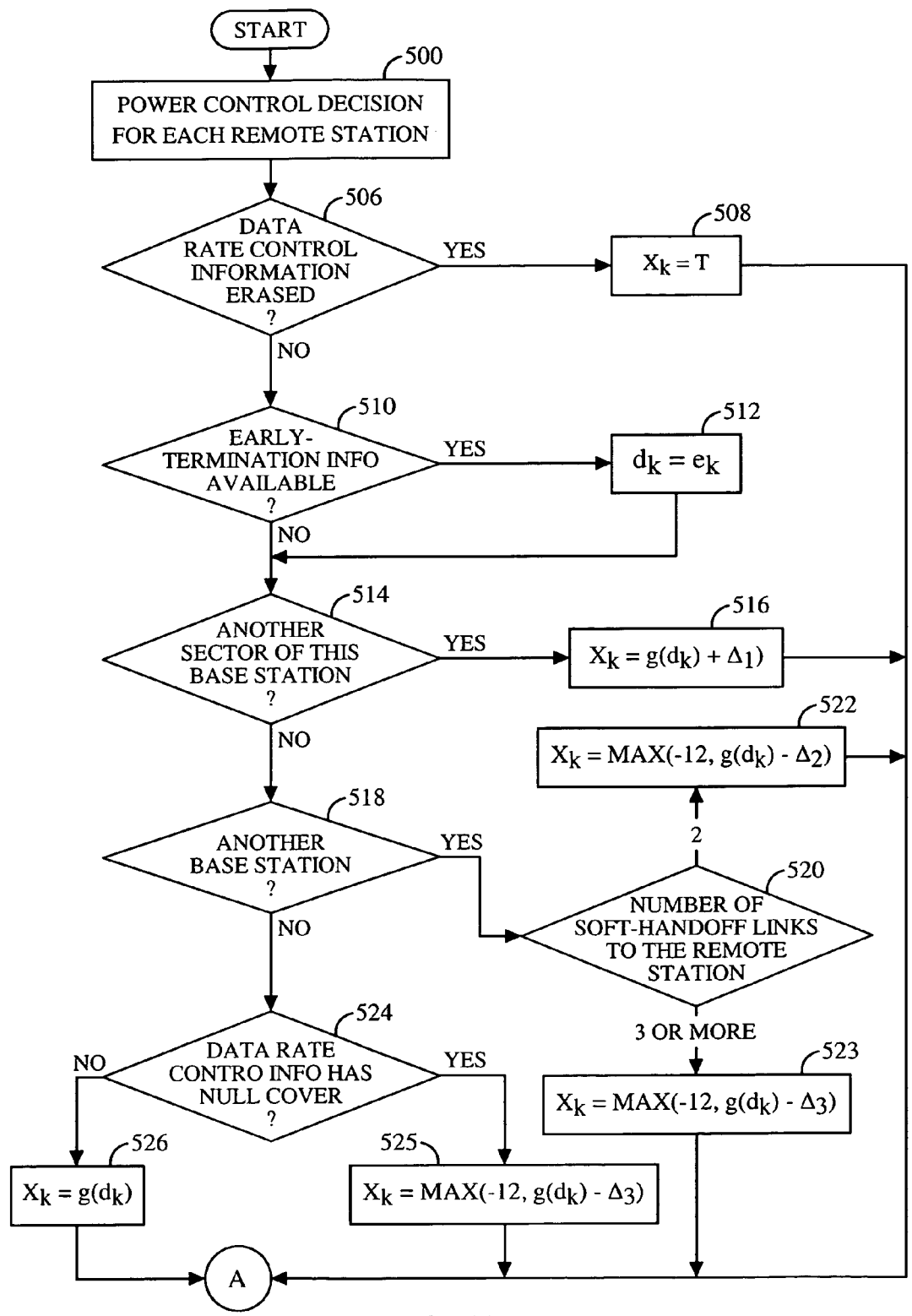
FIGS. 5A-5C are a flowchart illustrating a technique performed by a base station in accordance with one embodiment.
Figure 5B:
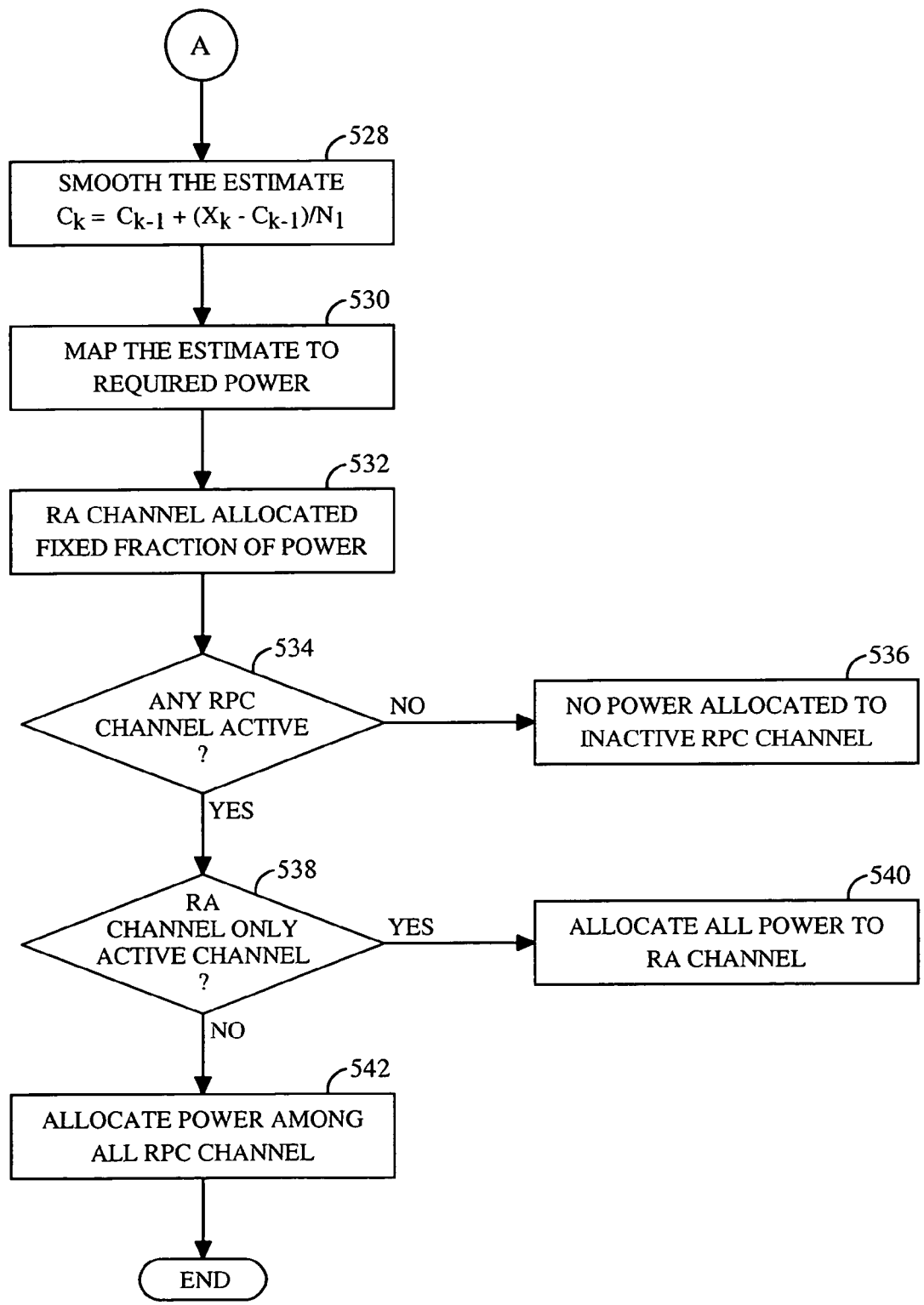

FIGS. 5A-5B show a flowchart that illustrates processing in the exemplary embodiment for determining the amount of power to allocate to each RPC channel, using the effective data rate. In the exemplary embodiment, the early-termination information (effective data rate) is used when available. The method of the exemplary embodiment is performed independently for each sector in a communication system. A base station estimates the average forward link SINR using the effective data rate, then calculates the required power for the RPC channel for the remote station receiving the forward link data, and finally allocates the power among RPC channels.

In particular, in accordance with the method, the base station 420 makes power control (PC) decisions for each remote station in its coverage area, at 500. However, in other embodiments, the PC decisions can be made by other entities such as the base station controller (BSC) or the like. A check is then made, at 506, to determine if the data rate control information has been erased (e.g., because no change in power is required). If the data rate control information has been erased, then the power is set to a constant (T), at 508. The base station 420 then determines, at 510, whether the early-termination information is available. The early-termination information (i.e. effective data rate) is available, and therefore used, when the data packet may be decoded with preliminary data and without having to read the entire packet. The availability of the early-termination information indicates that the effective data rate ($e_k$) is greater than the requested data rate ($d_k$) in the DRC channel from the remote station (i.e., $e_k \geq d_k$), and indicates that the quality of the forward link is better than estimated. This means that lower power may be used to transmit the RPC channel in the forward link while still ensuring reliable message transmission. Accordingly, if the packet decodes successfully for slots for which the early-termination information is available, then the data rate-SINR mapping function uses $e_k$ in place of $d_k$ ($=e_k$), at 512.

In a further embodiment, the data rate-SINR mapping function may use a filtered version of $e_k$ (referred to as $E_k$) in place of $d_k$, given by:

$$E_k=[(T_c-1)/T_c]E_{k-1}+(1/T_c)e_k,$$

where the term $T_c$ is the filter time constant. In this embodiment, the filter is configured as an Infinite Impulse Response (IIR) filter. However, other filters such as a Finite Impulse Response (FIR) filter may be used to smooth the effective data rate, $e_k$.

Since $E_k$ may not be a discrete rate, due to filtering, the data rate-SINR mapping function is modified to generate finer SINR estimates based on $E_k$. This may be accomplished by introducing additional entries in the data rate-SINR look-up table. Intermediate entries can be generated by interpolation (e.g., linear interpolation) between the existing entries so as to generate a mapping with the difference between adjacent SINR values less than 1 dB. The modified data rate-SINR mapping function uses the closest data rate control value in the look-up table that is lower than $E_k$ to generate a slightly more conservative SINR estimate. Accordingly, the use of the effective data rate results in a higher SINR estimate and a lower RPC power requirement to achieve the target RPC channel ratio of bit-energy-to-noise density ($E_b/N_o$).

At 514, the base station 420 determines whether the current data rate control information is "directed" at another sector of the base station 420. The data rate control information is directed at a particular sector if the data rate control information provides information about the rate at which the transmitting remote station can receive information from that sector. The information may be provided in any manner, such as a measure of the quality of the forward link, or the actual data rate that can be supported by the forward link. It should be noted that in accordance with an exemplary embodiment of the disclosed method and apparatus, each remote station transmits data rate control information at a predetermined rate. Each data rate control information indicates the source remote station of the message.

When the data rate control information is directed at another sector of the current base station, it is reasonable to assume that most of the power required for the RPC channel will be supplied by that sector. Since all sectors from the same base station transmit the same RPC commands and the remote station combines the signals from these sectors to demodulate the data rate control bit, the current sector needs to supply enough power so as not to degrade the transmission from the other sector. Hence, the value of the SINR estimate ($x_k$) is increased (i.e., the estimate of the required power is lowered) at 516, by a constant $\Delta_1$.

As discussed above, the quality of the forward link will determine the amount of power allocated to the RPC channel. Signals transmitted over lower quality links are transmitted with more power, while signals transmitted over higher quality links are transmitted with less power. Therefore, adjusting the quality value to indicate a higher quality link results in less power being allocated to the RPC channel associated with the remote station 461 from which no current data rate control information directed to that base station is available. This results in more power being available for the RPC channel associated with the remote station from which the base station has received a current data rate control information directed to that base station.

When the data rate control information is directed at another base station (as determined at 518), the data rate control information provides an indication of the SINR on the forward link from that base station to the remote station. Since generally the remote station directs its data rate control information to the sector with the best forward link, it can be assumed that the forward link from the current non-serving sector has a SINR that is lower than that indicated by the data rate control information. To account for this, $x_k$ is lowered in this case, i.e., the estimate of the required power is increased. Hence, when the data rate control information is directed at another base station, the base station adjusts the quality value downward. Such an adjustment results in more power being allocated to the RPC channel associated with that remote station 461. This is appropriate if there is a desire to increase the possibility that the RPC channel will be reliably received by the remote station 461. As noted above, there is a limited amount of total power available to transmit all of the RPC channels. Therefore, increasing the amount of power with which an RPC channel is transmitted to one remote station decreases the amount of power that is available to transmit RPC channels to the other remote stations.

In one embodiment, the amount of the adjustment is the same whether there are two base stations involved in a handoff or whether there are more than two base stations involved in the handoff. In another embodiment, the adjustment may depend on the number of base stations involved in the soft-handoff links to the remote stations (e.g., at 520). For example, if there are two base stations involved in the handoff, then a $\Delta_2$ adjustment constant is used, at 522, for estimating the SINR $x_k$. Thus, $$x_k=g(d_k)-\Delta_2.$$

Otherwise, if there are more than two base stations involved in the handoff, then a $\Delta_3$ adjustment constant is used, at 523, for estimating $x_k$. Thus, $$x_k=g(d_k)-\Delta_3.$$

Otherwise, if the data rate control information is received with the null cover (at 524), the SINR value is adjusted by a $\Delta_4$ adjustment constant, at 525.

$$x_k=g(d_k)-\Delta_4.$$

In all three cases, a predetermined minimum value is used to establish a threshold for the lowest value for the SINR estimate, which means that the adjusted SINR value is configured to be no less than the minimum value. In the exemplary embodiment, the minimum value is set at −12 dB. However, other values may be used for the minimum value.

If the data rate control information is not directed at another sector or base station, then the data rate control information is directed at the present sector, i.e., the same sector to which the prior data rate control information was directed, in which case, the SINR estimate is mapped at 526 without any adjustment (i.e., $x_k=g(d_k)$).

A summary of the data rate-SINR mapping function is shown below. The function $g(\cdot)$ denotes the mapping from a DRC value received in the $k^{th}$ slot, $d_k$, to a SINR estimate (in dB), $x_k$, as follows:

$$x_k = \begin{cases} g(d_k) & \text{if the data rate control information is directed at the present sector.} \\ g(d_k) + \Delta_1 & \text{if the data rate control information is directed at another sector in the present base station.} \\ \max(-12, g(d_k) - \Delta_2) & \text{if the data rate control information is directed at another sector and the remote station is in a 2-way soft handoff.} \\ \max(-12, g(d_k) - \Delta_3) & \text{if the data rate control information is directed at another sector and the remote station is in a 3-way (or more) soft handoff.} \\ \max(-12, g(d_k) - \Delta_4) & \text{if the data rate control information is received with the nullcover.} \\ T & \text{if the data rate control information is erased.} \end{cases}$$

The per-slot estimates $x_k$ are smoothed, at 528, using a filter, as follows:

$$c_k = c_{k-1} + (x_k - c_{k-1})/N_1,$$

where $N_1$ is the filter time constant in number of slots. In one embodiment, the filter is an Infinite Impulse Response (IIR) filter. In another embodiment, the filter is a Finite Impulse Response (FIR) filter. However, it will be understood by those skilled in the art that any filter that can smooth the estimates $x_k$ can be used. The smoothed SINR estimate is then mapped, at 530, to a required fractional RPC power allocation $r_k$ using the relationship $$r_k = 10^{0.1*(E - c_k - 10*\log_{10} PG)},$$

where E is the target RPC bit energy per noise power spectral density ($E_b/N_0$) in dB, and PG is the RPC subchannel processing gain (i.e., the duration of the RPC bit transmission in chips).

In one embodiment, the smooth filtering is implemented in software. In another embodiment, the smooth filtering is implemented in hardware. In yet another embodiment, the smooth filtering is implemented in a combination of software and hardware. In one embodiment, the smooth filtering is implemented using a lookup table. In another embodiment, the smooth filtering is executed by a software technique that performs smooth filtering computations.

For power allocation, the sum of the powers of all the RPC channels must be equal to that of the Pilot Channel power. In one embodiment, one of the RPC channels is assigned to a reverse activity (RA) bit that indicates active or inactive status and is allocated a fixed fraction $a_{RA}$ of the total allocated power, at 532. RPC channels are then checked, at 534, to determine whether they are active or inactive. For the RPC indices associated with the active remote stations, the required fractional allocation is the calculated required power. For inactive RPC channels, $r_k = 0$, i.e., no power is allocated to the inactive RPC channels at 536.

All RPC channels are checked, at 538, to determine which RPC channels are active. If the RA channel is the only active RPC channel, then all the available power is allocated to the RA channel at 540. Otherwise, the available power is divided up among the RPC channels, at 542. The available power may be divided according to a detailed diagram of FIG. 5C, which illustrates the processing for box 542 in an exemplary embodiment.

Figure 5C:
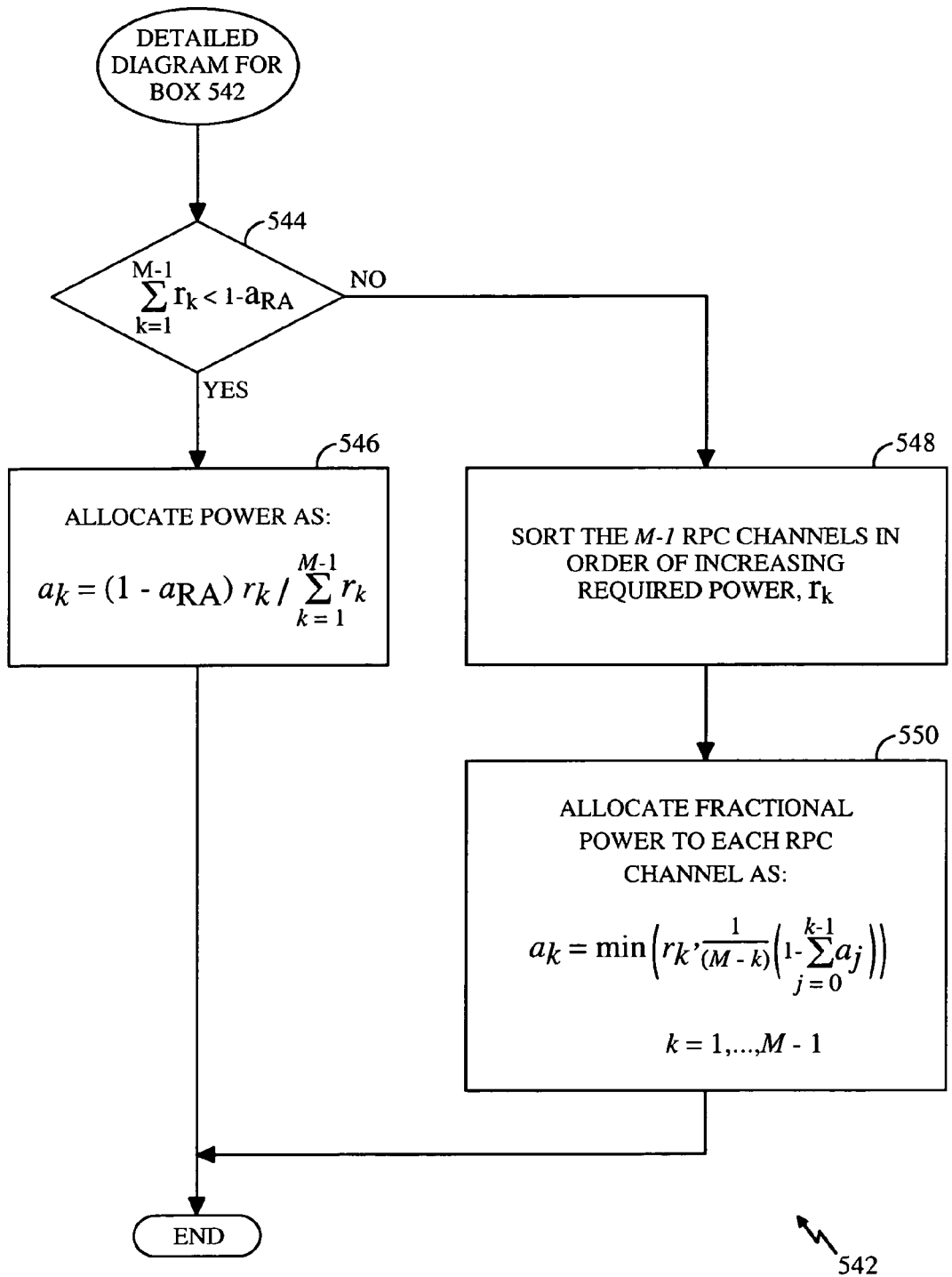

For the operations depicted in FIG. 5C, let $a_k$ denote the fractional RPC power allocation for the $k^{th}$ RPC channel. If it true that $$\sum_{k=1}^{M-1} r_k < 1 - a_{RA} \quad \text{(a "yes" outcome at box 544)}$$

where M is the number of RPC channels, then the power is allocated as $$a_k = (1 - a_{RA}) r_k \bigg/ \sum_{k=1}^{M-1} r_k, \text{ (see box 546)}.$$

Otherwise, if the reverse activity channel is not the only RPC channel and $$\sum_{k=1}^{M-1} r_k \text{ is not less than } 1 - a_{RA}, \text{(a "no" outcome at box 544)}$$

then the sum of the required powers for the active RPC subchannels is greater than the available power. Then, the available power may be allocated as follows:

Sort the M−1 RPC channels in order of increasing required power, as indicated by the processing of box 548, i.e., $r_1 \leq r_2 \leq r_3 \leq \ldots \leq r_{M-1}$. The fractional power allocated to each RPC channel is given by $$a_k = \min\left(r_k, \frac{1}{(M-k)}\left(1 - \sum_{j=0}^{k-1} a_j\right)\right), k = 1, \ldots, M-1,$$

as specified by the processing of box 550. This completes the operation of box 542 (FIG. 5B).

Table 1 shows exemplary values for constants used in the above listed equations. It will be apparent to those skilled in the art that the parameter values actually used may be different than those listed in Table 1, depending on network conditions and configurations. In addition, the parameter values may be variable. The default values listed in Table 1 have been found to provide satisfactory operation. The parameter values should depend upon the particular application and implementation.

TABLE 1

| Parameter | Default Value |
| --- | --- |
| $\Delta_1$ | 6 dB |
| $\Delta_2$ | 6 dB |
| $\Delta_3$ | 9 dB |
| $\Delta_4$ | 9 dB |
| T | −8 dB |
| $N_1$ | 64 slots |
| E | 0 dB |
| $a_{RA}$ | Variable |

In an alternative embodiment to using the SINR calculated from the received effective data rate in the RPC power allocation, the forward link SINR estimated in the remote station may be fed back from the remote station to the base station. It has been found that a good input to the RPC power allocation technique is a 1-slot prediction of the serving sector forward link SINR at the remote station updated at a slot rate, and this alternative embodiment operates such that the 1-slot SINR prediction (maintained by the channel estimation/prediction technique at the remote station) could be fed back to the base station. This is equivalent to computing g(d$_k$) of the mapping function in the remote station instead of in the base station. An accurate 1-slot prediction would result in the RPC power allocation using the predicted SINR for the next slot to allocate power on the RPC channel for that slot for all users. In contrast, as described above, the conventional RPC power allocation technique typically allocates power based on the data rate control information which, depending on the data rate, is an estimate of the channel over 1, 2, 4, 8, or 16 slots.

However, the effectiveness of this SINR feedback technique generally depends on several factors, including feedback channel reliability, quantization, and degradation of available reverse link capacity. For example, feedback channel quantization and reliability dictate the accuracy of the RPC power allocation. Further, providing a highly quantized feedback at the slot rate may consume significant capacity on the reverse link, which can make the scheme undesirable.

Figure 6:
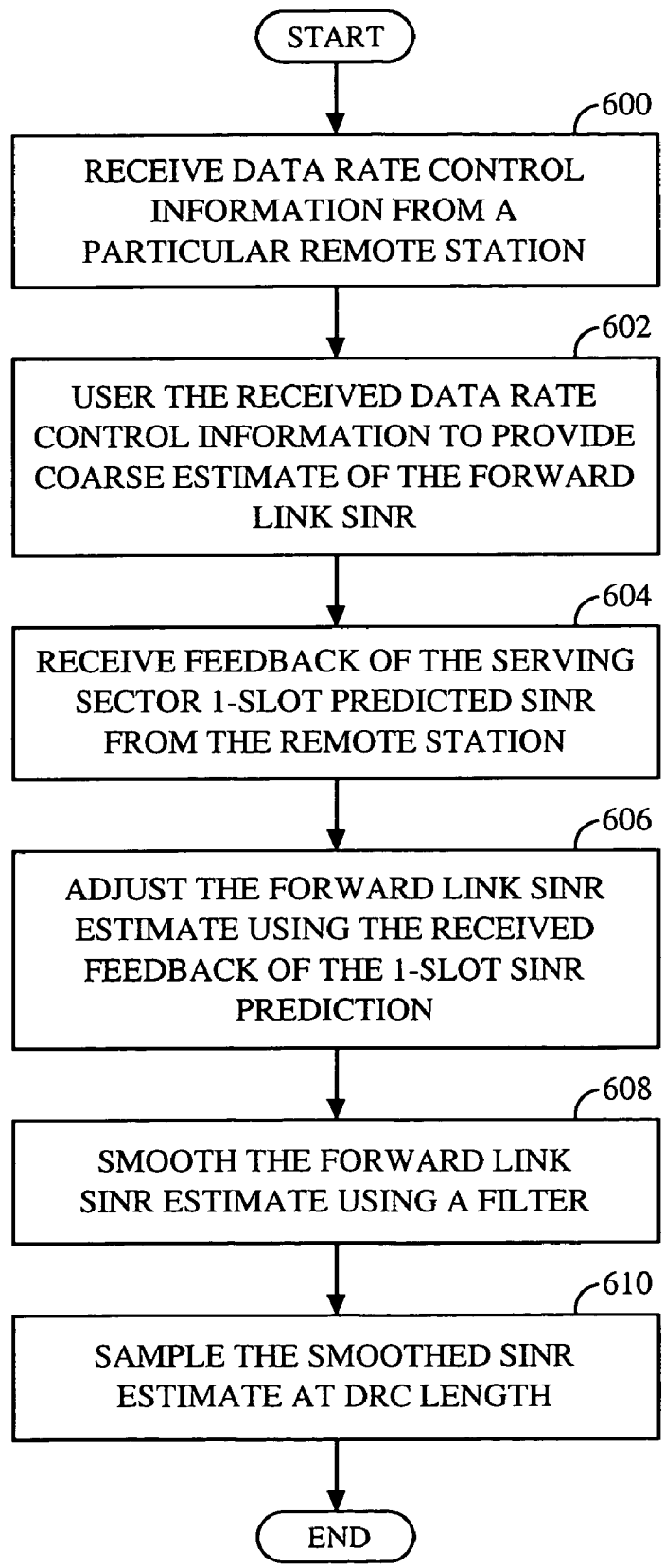
FIG. 6 is a block diagram illustrating a hybrid solution using the requested DRC as a coarse estimate of the forward link SINR, and fine tuning this estimate by using the feedback of the serving sector 1-slot predicted SINR.

Accordingly, in another alternative embodiment to using only the SINR calculated from the received data rate control information in the RPC power allocation, a hybrid solution illustrated in FIG. 6 may be used where the data rate control information provides a coarse estimate of the forward link SINR, and additional information for fine tuning this estimate is provided by the feedback of the serving sector 1-slot predicted SINR. The requested DRC is received from a particular remote station at 600. The data rate control information is used, at 602, to provide a coarse estimate of the forward link SINR. At 604, feedback of the serving sector 1-slot predicted SINR is received from the particular remote station. The coarse estimate of the forward link SINR is then adjusted or fine tuned, at 606, using the received feedback of the 1-slot SINR prediction from the remote station, as described below. In one embodiment, the SINR feedback is a differential prediction. In another embodiment, the SINR feedback is a complete SINR prediction.

A typical difference in SINR based on data rate-SINR mapping and the 1-slot SINR prediction is in the 1 to 10 dB range. Adjusting for a difference larger than 10 dB is unlikely to result in significant power savings on the RPC channel. Thus, a differential SINR feedback channel provides feedback of the 1-slot predicted SINR using a small number of bits, such as one to three bits.

In this embodiment, the SINR estimate $x_k$ from the mapping function g(•) is modified as $$x_k = x_k + s_k,$$

where $s_k$ is the differential SINR feedback in dB received from the remote station on the differential SINR feedback (DSFB) channel. However, the DRC channel erasure rate for a degraded DRC channel may be very high (>70%) and therefore a SINR feedback channel that adjusts the estimate provided by the DRC channel may not provide an accurate estimate of the SINR. Since the erased data rate control values are mapped to a SINR estimate of T=−8 dB (see Table 1), the feedback mechanism may be further improved using a complete feedback of the 1-slot SINR prediction. This feedback channel is sometimes referred to as the SINR feedback channel (SFB). Thus, in this case, the SINR estimate $x_k$ from the mapping function g(•) is modified as $$x_k = s_k,$$

where $s_k$ is the complete SINR feedback in dB received from the remote station on the SINR feedback channel (SFB). Thus, the feedback mechanism sets the SINR estimate equal to the SINR feedback level in dB. The SINR feedback to within 1 dB (which may be achieved using a 4-bit complete SFB channel) should provide sufficient accuracy for accurate RPC channel power allocation.

The SINR estimates fed into the RPC power allocation technique are smoothed, at 608, using a filter such as an IIR filter, and sampled at DRC Length (at 610). The SINR estimates may be filtered at the remote station prior to feedback to minimize the impact on the reverse link capacity. Further, if the 1-slot prediction of the forward link SINR is fed back to the base station, the DRC channel may be simplified to provide only the delta information between the maximum data rate that the remote station can decode reliably on the forward link and the 1-slot SINR prediction. In a further embodiment, the SINR feedback is transmitted using a Walsh code orthogonal to the existing channels on the IS-856 (cdma2000 HDR interface) reverse link. Power control for the SINR feedback channel performs similar to that on the Traffic, DRC, and ACK channels, i.e., a fixed feedback channel to Pilot ratio is maintained.

Although the operations or procedures described for the power allocation technique were presented in a particular sequence, the operations/procedures may be interchanged without departing from the scope of the invention.

Figure 7:
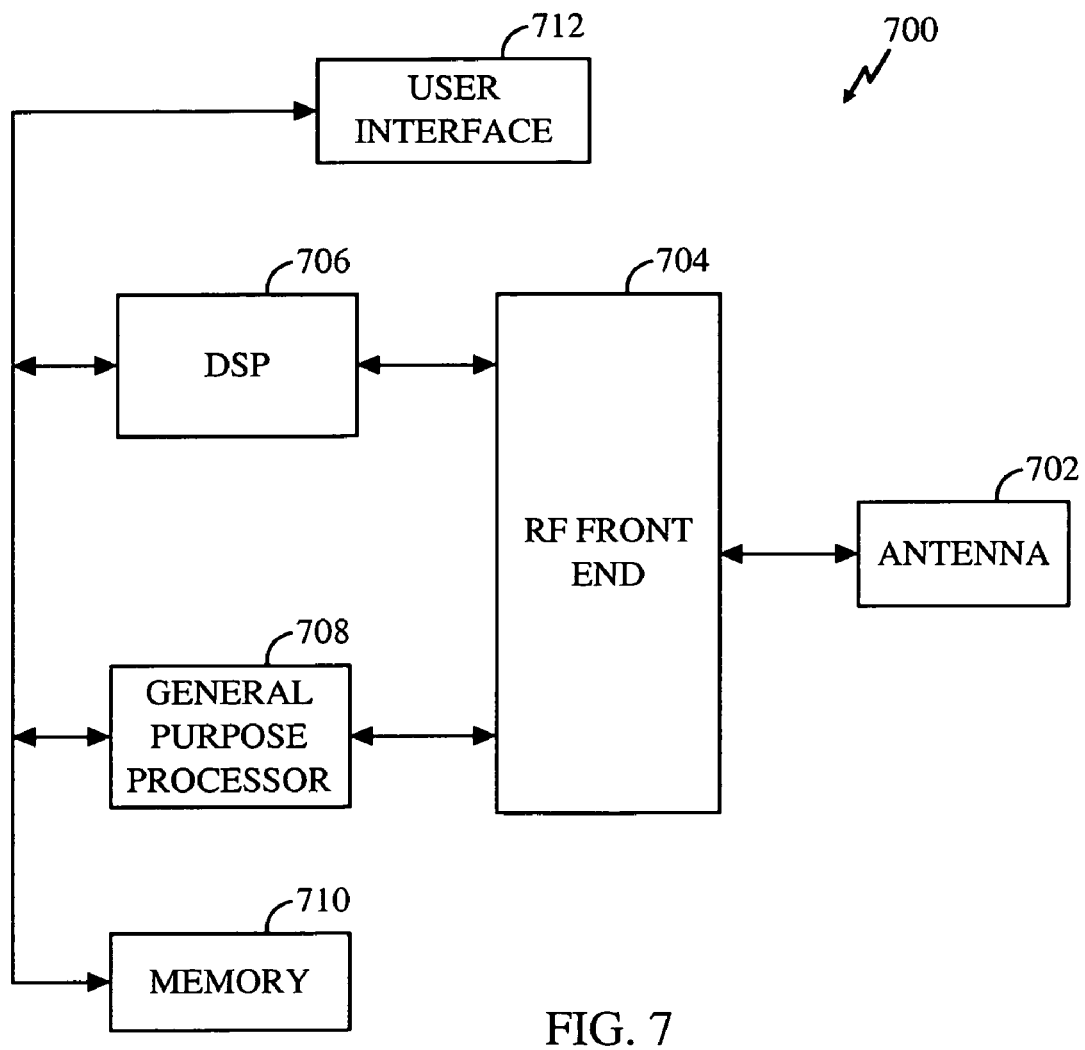
FIG. 7 is a block diagram of a remote station in accordance with one embodiment of the disclosed apparatus.

FIG. 7 is a block diagram of a remote station 700 constructed in accordance with one embodiment of the disclosed apparatus. The remote station 700 includes an antenna 702, a radio frequency (RF) front end 704, a digital signal processor (DSP) 706, a general purpose processor 708, a memory 710, and a user interface 712.

In accordance with the disclosed method and apparatus, the antenna 702 receives forward link signals from one or more base stations. The signals are appropriately amplified, filtered and otherwise processed by the RF front end 704. Output from the RF front end 704 is then applied to the DSP 706. The DSP 706 decodes the received forward link signals. In addition, the DSP 706 provides an indication as to the relative quality of the received forward link. The indication of relative quality is stored in the remote station memory 710. The General Purpose Processor 708 is coupled to the DSP 706 and to the memory 710. The General Purpose Processor 708 reads the indications of relative quality from the memory 710 and determines the rate at which each received forward link can support data, and determines which forward link can support the highest data rate. Once the General Purpose Processor 708 has selected the forward link that can support the highest data rate, the General Purpose Processor 708 communicates the selection to the DSP 706. The DSP 706 encodes and modulates the information in the data rate control information, together with any information from the user interface 712, into a reverse link output signal that is provided to the RF front end 704. The RF front end processes the reverse link output signal and couples the reverse link output signal to the antenna for transmission to each base station capable of receiving the signal.

Figure 8:
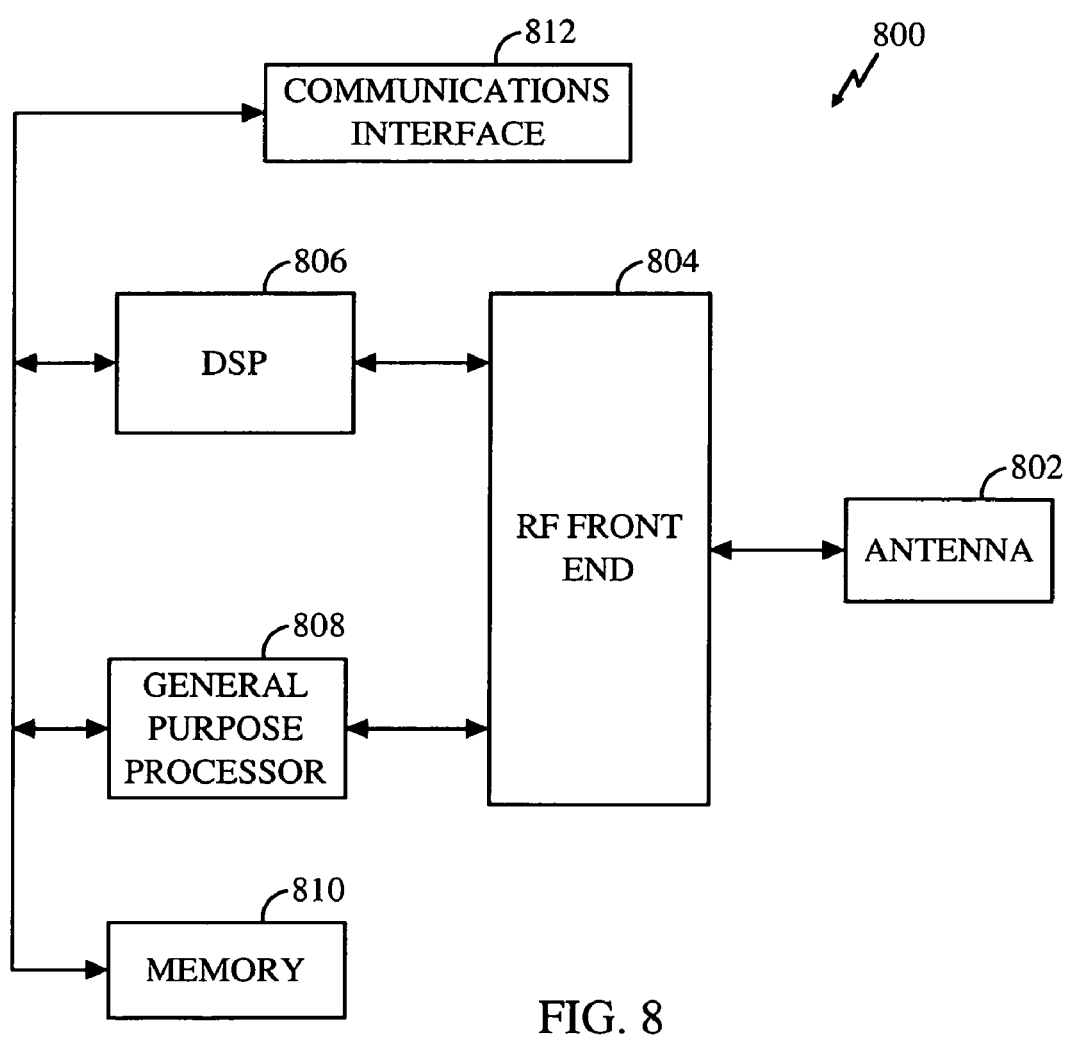
FIG. 8 is a block diagram of a base station in accordance with one embodiment of the disclosed apparatus.

FIG. 8 is a block diagram of a base station 800 in accordance with one embodiment of the disclosed apparatus. The base station 800 includes a transmitter, such as an antenna 802 and a radio frequency (RF) front end 804. The base station

800 further includes a digital signal processor (DSP) 806, a general purpose processor 808, a memory 810, and a communication interface 812.

In accordance with the disclosed apparatus, the antenna 802 receives reverse link signals that have been transmitted from nearby remote stations 700. The antenna couples these received signals to an RF front end 804 which filters and amplifies the signals. The signals are coupled from the RF front end 804 to the DSP 806 and to the general purpose processor 808 for demodulation, decoding, further filtering, etc. Upon decoding the data rate control information from the received reverse link signals, the DSP 806 stores the decoded DRC in the memory 810. In addition, the DSP 806 determines whether each received reverse link was transmitted from the remote station with too much or too little power. It should be noted that the Base station 800 typically receives reverse link signals from more than one remote station 700 at a time.

The general purpose processor 808 of the base station 800 then performs the process described in FIGS. 5A-5B, including the computation of the effective data rate received from the remote station 700. The general purpose processor 808 communicates to the DSP 806 the amount of power that should be allocated to each RPC channel. Based upon the allocation of power to each RPC channel, the DSP 806 modulates and encodes the forward link signals to be transmitted by the base station 800. The signal is coupled to the RF front end 804. The RF front end couples the signal to the antenna 802, which transmits the forward link signal to the remote stations.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and technique described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The operations of a method or technique described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium can be coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for allocating power to a forward link power control channel, the method being implemented by a base station, the method comprising:
   determining that early-termination information is available;
   using the early-termination information to determine an effective data rate;
   using the effective data rate to determine a forward link signal strength value; and
   determining a power allocation value for power control information that is transmitted from the base station to a remote station based on the forward link signal strength value.

2. The method of claim 1, further comprising receiving data rate control information from the remote station, wherein the effective data rate is used instead of the data rate control information to determine the forward link signal strength value.

3. The method of claim 2, wherein the effective data rate is higher than a data rate that is requested by the remote station via the data rate control information.

4. The method of claim 1, wherein using the effective data rate to determine the forward link signal strength value comprises mapping the effective data rate to the forward link signal strength value via a look-up table.

5. The method of claim 1, further comprising filtering the effective data rate.

6. The method of claim 1, further comprising smoothing the forward link signal strength value using a filter.

7. The method of claim 1, wherein the effective data rate is used to determine the forward link signal strength value for a period of time that is longer than a current slot.

8. The method of claim 7, wherein the period of time includes the current slot plus a predetermined number of slots.

9. The method of claim 7, wherein the effective data rate is used to determine the forward link signal strength value until a new data packet is received.

10. The method of claim 2, further comprising increasing the forward link signal strength value if the data rate control information is directed at another sector of the base station.

11. The method of claim 2, further comprising decreasing the forward link signal strength value if the data rate control information is directed at another base station.

12. A base station that is configured to allocate power to a forward link power control channel, comprising:
a processor;
memory in electronic communication with the processor; and
instructions stored in the memory, the instructions being executable to:
determine that early-termination information is available;
use the early-termination information to determine an effective data rate;
use the effective data rate to determine a forward link signal strength value; and
determine a power allocation value for power control information that is transmitted from the base station to a remote station based on the forward link signal strength value.

13. The base station of claim 12, wherein the instructions are also executable to receive data rate control information from the remote station, wherein the effective data rate is used instead of the data rate control information to determine the forward link signal strength value.

14. The base station of claim 13, wherein the effective data rate is higher than a data rate that is requested by the remote station via the data rate control information.

15. The base station of claim 12, wherein using the effective data rate to determine the forward link signal strength value comprises mapping the effective data rate to the forward link signal strength value via a look-up table.

16. The base station of claim 12, wherein the instructions are also executable to filter the effective data rate.

17. The base station of claim 12, wherein the instructions are also executable to smooth the forward link signal strength value using a filter.

18. The base station of claim 12, wherein the effective data rate is used to determine the forward link signal strength value for a period of time that is longer than a current slot.

19. The base station of claim 18, wherein the period of time includes the current slot plus a predetermined number of slots.

20. The base station of claim 18, wherein the effective data rate is used to determine the forward link signal strength value until a new data packet is received.

21. The base station of claim 13, wherein the instructions are also executable to increase the forward link signal strength value if the data rate control information is directed at another sector of the base station.

22. The base station of claim 13, wherein the instructions are also executable to decrease the forward link signal strength value if the data rate control information is directed at another base station.

23. A base station that is configured to allocate power to a forward link power control channel, comprising:
means for determining that early-termination information is available;
means for using the early-termination information to determine an effective data rate;
means for using the effective data rate to determine a forward link signal strength value; and
means for determining a power allocation value for power control information that is transmitted from the base station to a remote station based on the forward link signal strength value.

24. The base station of claim 23, further comprising means for receiving data rate control information from the remote station, wherein the effective data rate is used instead of the data rate control information to determine the forward link signal strength value.

25. The base station of claim 24, wherein the effective data rate is higher than a data rate that is requested by the remote station via the data rate control information.

26. The base station of claim 23, wherein the means for using the effective data rate to determine the forward link signal strength value comprises means for mapping the effective data rate to the forward link signal strength value via a look-up table.

27. The base station of claim 23, further comprising means for filtering the effective data rate.

28. The base station of claim 23, further comprising means for smoothing the forward link signal strength value using a filter.

29. The base station of claim 23, wherein the effective data rate is used to determine the forward link signal strength value for a period of time that is longer than a current slot.

30. The base station of claim 29, wherein the period of time includes the current slot plus a predetermined number of slots.

31. The base station of claim 29, wherein the effective data rate is used to determine the forward link signal strength value until a new data packet is received.

32. The base station of claim 24, further comprising means for increasing the forward link signal strength value if the data rate control information is directed at another sector of the base station.

33. The base station of claim 24, further comprising means for decreasing the forward link signal strength value if the data rate control information is directed at another base station.

34. A non-transitory computer-readable medium comprising instructions that are executable to:
determine that early-termination information is available;
use the early-termination information to determine an effective data rate;
use the effective data rate to determine a forward link signal strength value; and
determine a power allocation value for power control information that is transmitted from a base station to a remote station based on the forward link signal strength value.

35. The computer-readable medium of claim 34, wherein the instructions are also executable to receive data rate control information from the remote station, wherein the effective data rate is used instead of the data rate control information to determine the forward link signal strength value.

36. The computer-readable medium of claim 35, wherein the effective data rate is higher than a data rate that is requested by the remote station via the data rate control information.

37. The computer-readable medium of claim 34, wherein using the effective data rate to determine the forward link signal strength value comprises mapping the effective data rate to the forward link signal strength value via a look-up table.

38. The computer-readable medium of claim 34, wherein the instructions are also executable to filter the effective data rate.

39. The computer-readable medium of claim 34, wherein the instructions are also executable to smooth the forward link signal strength value using a filter.

40. The computer-readable medium of claim 34, wherein the effective data rate is used to determine the forward link signal strength value for a period of time that is longer than a current slot.

41. The computer-readable medium of claim 40, wherein the period of time includes the current slot plus a predetermined number of slots.

42. The computer-readable medium of claim 40, wherein the effective data rate is used to determine the forward link signal strength value until a new data packet is received.

43. The computer-readable medium of claim 35, wherein the instructions are also executable to increase the forward link signal strength value if the data rate control information is directed at another sector of the base station.

44. The computer-readable medium of claim 35, wherein the instructions are also executable to decrease the forward link signal strength value if the data rate control information is directed at another base station.

* * * * *